US005293448A

United States Patent [19]

Honda

[11] Patent Number: 5,293,448

[45] Date of Patent: Mar. 8, 1994

[54] SPEECH ANALYSIS-SYNTHESIS METHOD AND APPARATUS THEREFOR

[75] Inventor: Masaaki Honda, Kodaira, Japan

[73] Assignee: Nippon Telegraph and Telephone Corporation, Tokyo, Japan

[21] Appl. No.: 939,049

[22] Filed: Sep. 3, 1992

Related U.S. Application Data

[63] Continuation of Ser. No. 592,444, Oct. 2, 1990, abandoned.

[30] Foreign Application Priority Data

Oct. 2, 1989 [JP] Japan ................................ 1-257503

[51] Int. Cl.[5] ................................ G01L 9/18

[52] U.S. Cl. ................................ 395/2.17; 395/2.2; 395/2.28

[58] Field of Search ................................ 395/2; 381/29-40

[56] References Cited

U.S. PATENT DOCUMENTS 4,771,465 9/1988 Bronson et al. ................ 381/38
4,850,022 7/1989 Honda et al. ................ 381/38
4,868,867 9/1989 Davidson et al. ................ 381/36
4,944,013 7/1990 Gouvianakis ................ 381/38
4,989,250 1/1991 Fujimoto et al. ................ 381/38
5,001,759 3/1991 Fukui ................ 381/38

*Primary Examiner*—David D. Knepper
*Attorney, Agent, or Firm*—Pollock, Vande Sande and Priddy

[57] ABSTRACT

An impulse sequence of a pitch frequency is detected from a phase-equalized prediction residual of an input speech signal, and a quasi-periodic impulse sequence is obtained by processing the impulse sequence so that a fluctuation in its pitch frequency is within an allowed limit range. The magnitudes of the quasi-periodic impulse sequence are so determined as to minimize an error between the waveform of a synthesized speech obtainable by exciting an all-pole filter with the quasi-periodic impulse sequence and the waveform of a phase-equalized speech obtainable by applying the input speech signal to a phase equalizing filter. Preferably, the quasi-periodic impulse sequence is supplied to the all-pole filter after being applied to a zero filter in which it is given features of the prediction residual of the speech. Coefficients of the zero filter are also determined so that the error of the waveforms of the synthesized speech and the phase-equalized speech is minimum.

7 Claims, 8 Drawing Sheets

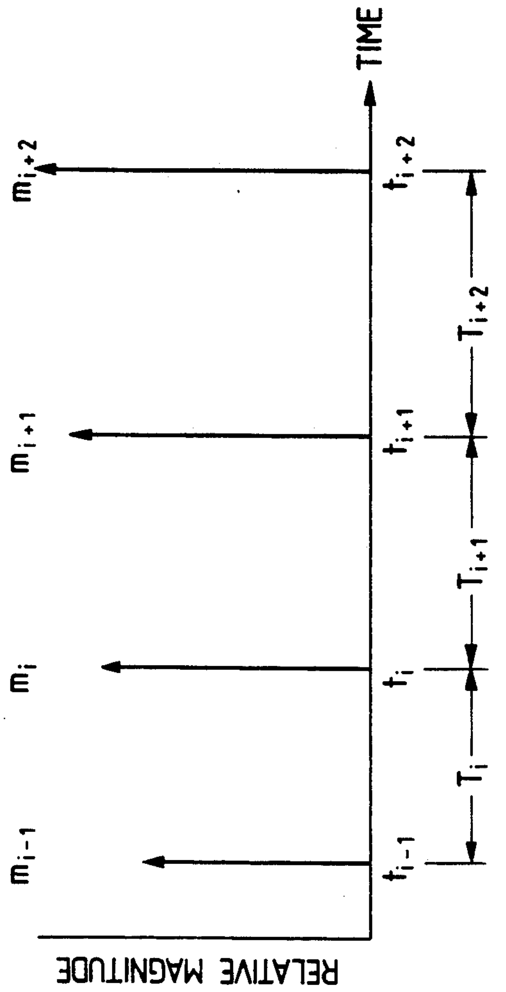
FIG. 3
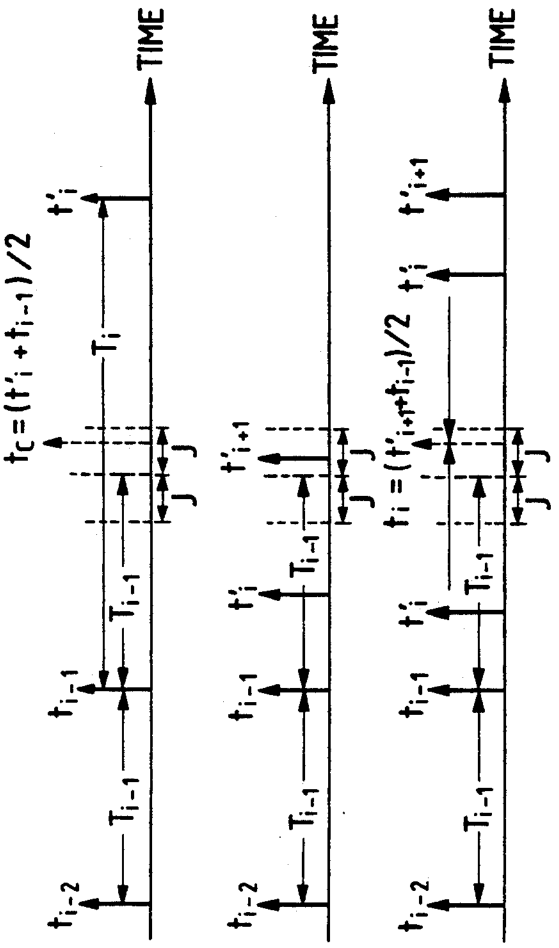
FIG. 5A
FIG. 5B
FIG. 5C

SPEECH ANALYSIS-SYNTHESIS METHOD AND APPARATUS THEREFOR

This application is a continuation of Ser. No. 07/592,444, filed on Oct. 2, 1990, now abandoned.

BACKGROUND OF THE INVENTION

The present invention relates to a speech analysis-synthesis method and apparatus in which a linear filter representing the spectral envelope characteristic of a speech is excited by an excitation signal to synthesize a speech signal.

Heretofore, linear predictive vocoder and multipulse predictive coding have been proposed for use in speech analysis-synthesis systems of this kind. The linear predictive vocoder is now widely used for speech coding in a low bit rate region below 4.8 kb/s and this system includes a PARCOR system and a line spectrum pair (LSP) system. These systems are described in detail in Saito and Nakata, "Fundamentals of Speech Signal Processing," ACADEMIC PRESS, INC., 1985, for instance. The linear predictive vocoder is made up of an all-pole filter representing the spectral envelope characteristic of a speech and an excitation signal generating part for generating a signal for exciting the all-pole filter. The excitation signal is a pitch frequency impulse sequence for a voiced sound and a white noise for an unvoiced sound. Excitation parameters are the distinction between voiced and unvoiced sounds, the pitch frequency and the magnitude of the excitation signal. These parameters are extracted as average features of the speech signal in an analysis window about 30 msec. In the linear predictive vocoder, since speech feature parameters extracted for each analysis window as mentioned above are interpolated temporarily to synthesize a speech, features of its waveform cannot be reproduced with sufficient accuracy when the pitch frequency, magnitude and spectrum characteristic of the speech undergo rapid changes. Furthermore, since the excitation signal composed of the pitch frequency impulse sequence and the white noise is insufficient for reproducing features of various speech waveforms, it is difficult to produce highly natural-sounding synthesized speech. To improve the quality of the synthesized speech in the linear predictive vocoder, it is considered in the art to use excitation which permits more accurate reproduction of features of the speech waveform.

On the other hand, multipulse predictive coding is a method that uses excitation of higher producibility than in the conventional vocoder. With this method, the excitation signal is expressed using a plurality of impulses and two all-pole filters representing proximity correlation and pitch correlation characteristics of speech are excited by the excitation signal to synthesize the speech. The temporal positions and magnitudes of the impulses are selected such that an error between input original and synthesized speech waveforms is minimized. This is described in detail in B. S. Atal, "A New Model of LPC Excitation for Producing Natural-Sounding Speech at Low Bit Rates," IEEE Int. Conf on ASSP, pp 614–617, 1982. With the multipulse predictive coding, the speech quality can be enhanced by increasing the number of impulses used, but when the bit rate is low, the number of impulses is limited, and consequently, reproducibility of the speech waveform is impaired and no sufficient speech quality can be obtained. It is considered in the art that an amount of information of about 8 kb/s is needed to produce high speech quality.

In multipulse predictive coding, excitation is determined so that the input speech waveform itself is reproduced. On the other hand, there has also been proposed a method in which a phase-equalized speech signal resulting from equalization of a phase component of the speech waveform to a certain phase is subjected to multiphase predictive coding, as set forth in U.S. Pat. No. 4,850,022 issued to the inventor of this application. This method improves the speech quality at low bit rates, because the number of impulses for reproducing the excitation signal can be reduced by removing from the speech waveform the phase component of a speech which is dull in terms of human hearing. With this method, however, when the bit rate drops to 4.8 kb/s or so, the number of impulses becomes insufficient for reproducing features of the speech waveform with high accuracy and no high quality speech can be produced, either.

SUMMARY OF THE INVENTION

It is therefore an object of the present invention to provide a speech analysis-synthesis method and apparatus which permit the production of high quality speech at bit rates ranging from 2.4 to 4.8 kb/s, i.e. in the boundary region between the amounts of information needed for the linear predictive vocoder and for the speech waveform coding.

According to the present invention, a zero filter is excited by a quasi-periodic impulse sequence derived from a phase-equalized prediction residual of an input speech signal and the resulting output signal from the zero filter is used as an excitation signal for a voiced sound in the speech analysis-synthesis. The coefficients of the zero filter are selected such that an error between a speech waveform synthesized by exciting an all-pole prediction filter by the excitation signal and the phase-equalized input signal is minimized. The zero filter, which is placed under the control of the thus selected coefficients, can synthesize an excitation signal accurately representing features of the prediction residual of the phase-equalized speech, in response to the above-mentioned quasi-periodic impulse sequence. By using the position and magnitude of each impulse of an input impulse sequence and the coefficients of the zero filter as parameters representing the excitation signal, high quality speech can be synthesized with a smaller amount of information.

Based on the pitch frequency impulse sequence obtained from the phase-equalized prediction residual, a quasi-periodic impulse sequence having limited fluctuation in its pitch period is produced. By using the quasi-periodic impulse sequence as the above-mentioned impulse sequence, it is possible to further reduce the amount of parameter information representing the impulse sequence.

In the conventional vocoder the pitch period impulse sequence composed of the pitch period and magnitudes obtained for each analysis window is used as the excitation signal, whereas in the present invention the impulse position and magnitude are determined for each pitch period and, if necessary, the zero filter is introduced, with a view to enhancing the reproducibility of the speech waveform. In conventional multipulse predictive coding a plurality of impulses are used to represent the excitation signal of one pitch period, whereas in the present invention the excitation signal is represented by impulses each per pitch and the coefficients of the zero filter set for each fixed frame so as to reduce the amount of information for the excitation signal. Besides, the prior art employs, as a criterion for determining the excitation parameters, an error between the input speech waveform and the synthesized speech waveform, whereas the present invention uses an error between the input speech waveform and the phase-equalized speech waveform. By using a waveform matching criterion for the phase-equalized speech waveform, it is possible to improve matching between the input speech waveform and the speech waveform synthesized from the excitation signal used in the present invention. Since the phase-equalized speech waveform and the synthesized one are similar to each other, the number of excitation parameters can be reduced by determining them while comparing the both speech waveforms.

BRIEF DESCRIPTION OF THE DRAWINGS

FIG. 3 is a diagram for explaining a quasi-periodic impulse excitation signal;

FIG. 5A is a diagram for explaining the insertion of an impulse position in FIG. 4;

FIG. 5B is a diagram for explaining the removal of an impulse position in FIG. 4;

FIG. 5C is a diagram for explaining the shift of an impulse position in FIG. 4;

DESCRIPTION OF THE PREFERRED EMBODIMENTS

Figures 1, 1A:
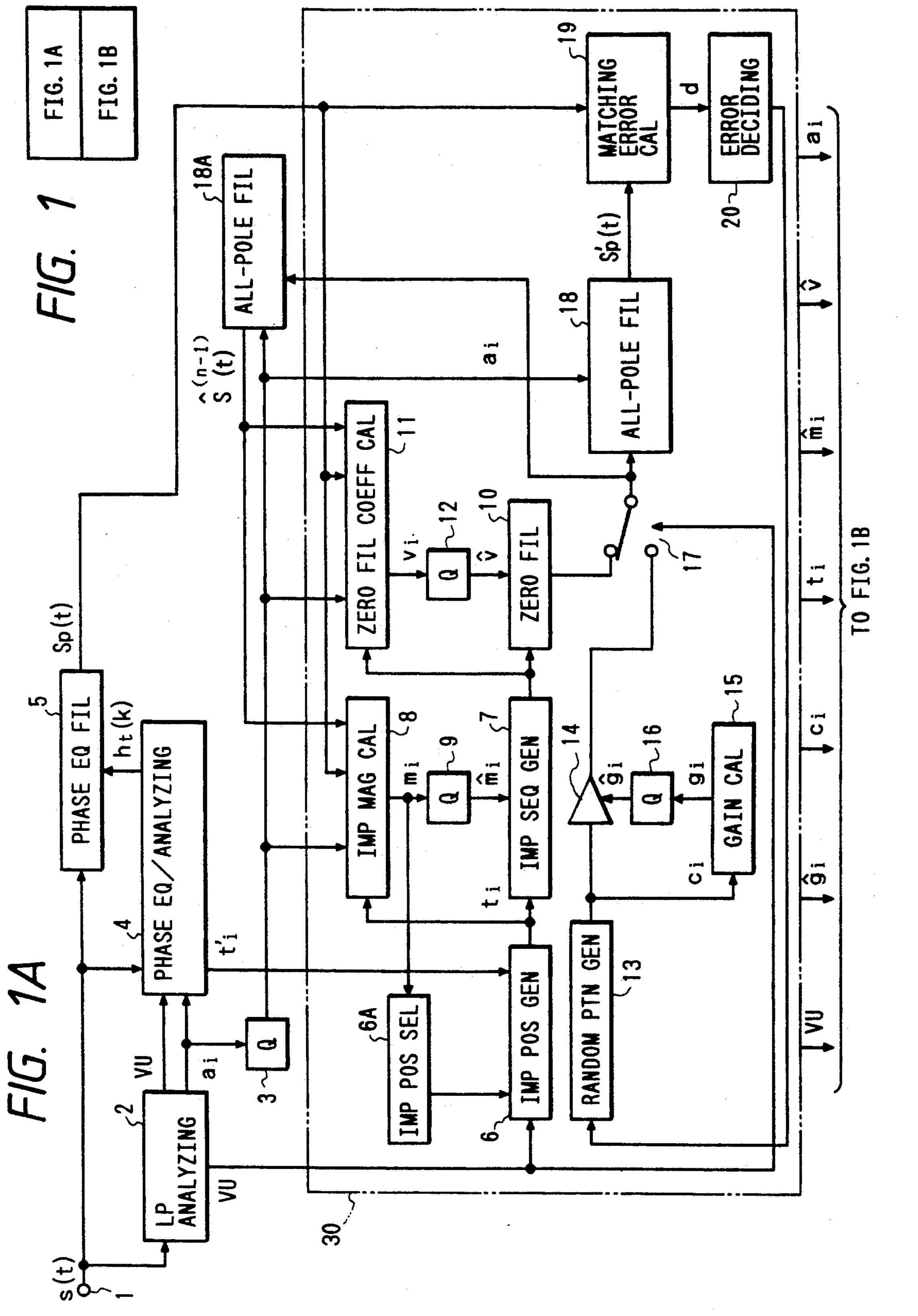
FIGS. 1A and 1B, considered together in the manner shown in FIG. 1, constitute a block diagram illustrating an embodiment of the speech analysis-synthesis method according to the present invention.
Figure 1B:
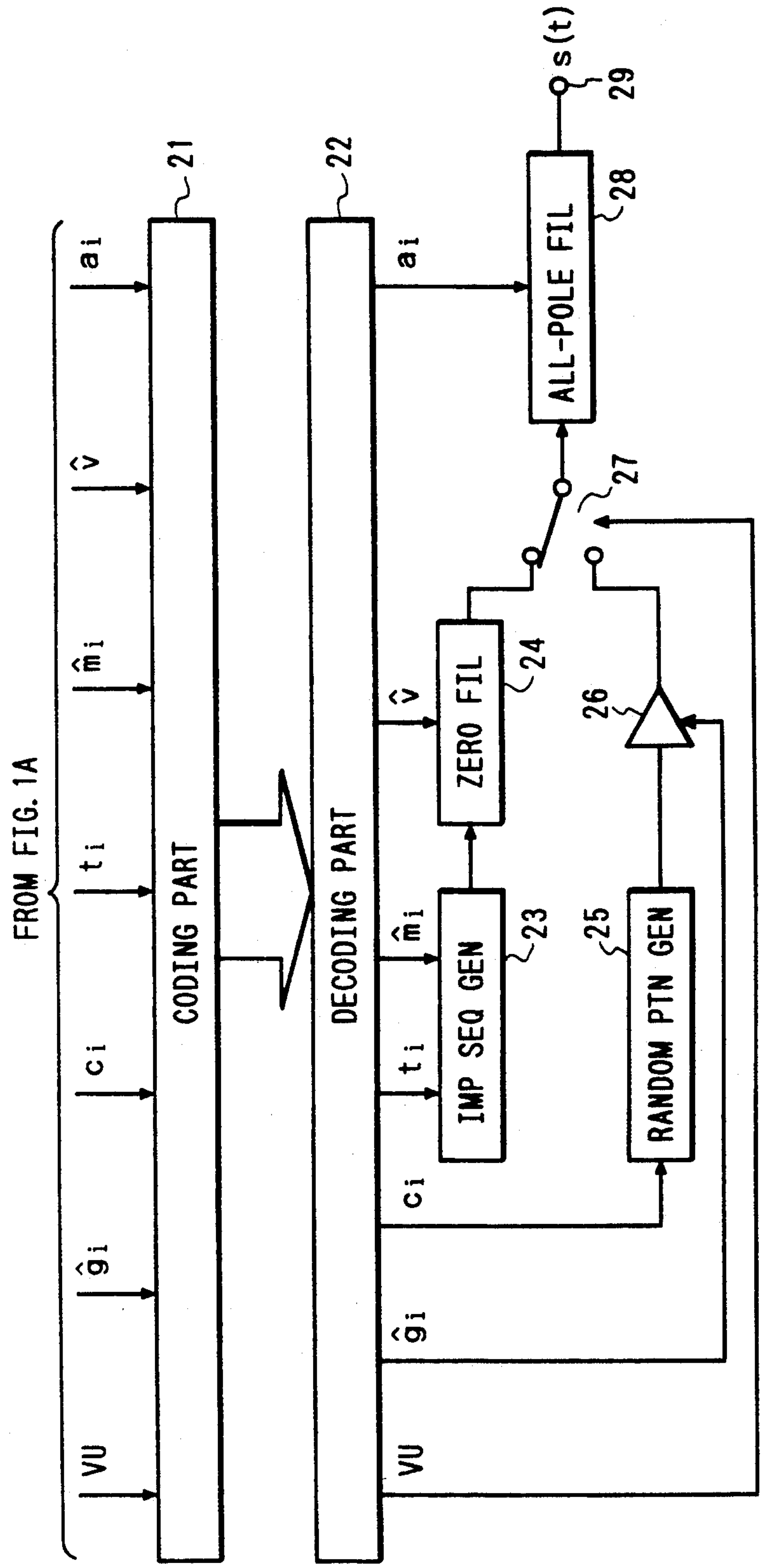

FIG. 1 i.e., FIGS. 1A and 1B illustrates in block form the constitution of the speech analysis-synthesis system of the present invention. A sampled digital speech signal s(t) is input via an input terminal 1. In a linear predictive analyzing part 2 samples of N speech signals are first stored in a data buffer for each analysis window and then these samples are subjected to a linear predictive analysis by a known linear predictive coding method to calculate a set of prediction coefficients $a_i$ (where $i=1, 2, \ldots, p$). In the linear predictive analyzing part 2 a prediction residual signal e(t) of the input speech signal s(t) is obtained by an inverse filter (not shown) which uses the set of prediction coefficients as its filter coefficients. Based on the decision of the level for a maximum value of an auto-correlation function of the prediction residual signal, it is determined whether the speech is voiced (V) or unvoiced (U) and a decision signal VU is output accordingly. This processing is described in detail in the aforementioned literature by Saito, et al. The set of prediction coefficients $a_i$ obtained in the linear predictive analyzing part 2 is provided to a phase equalizing-analyzing part 4 and, at the same time, it is quantized by a quantizer 3.

Figure 2:
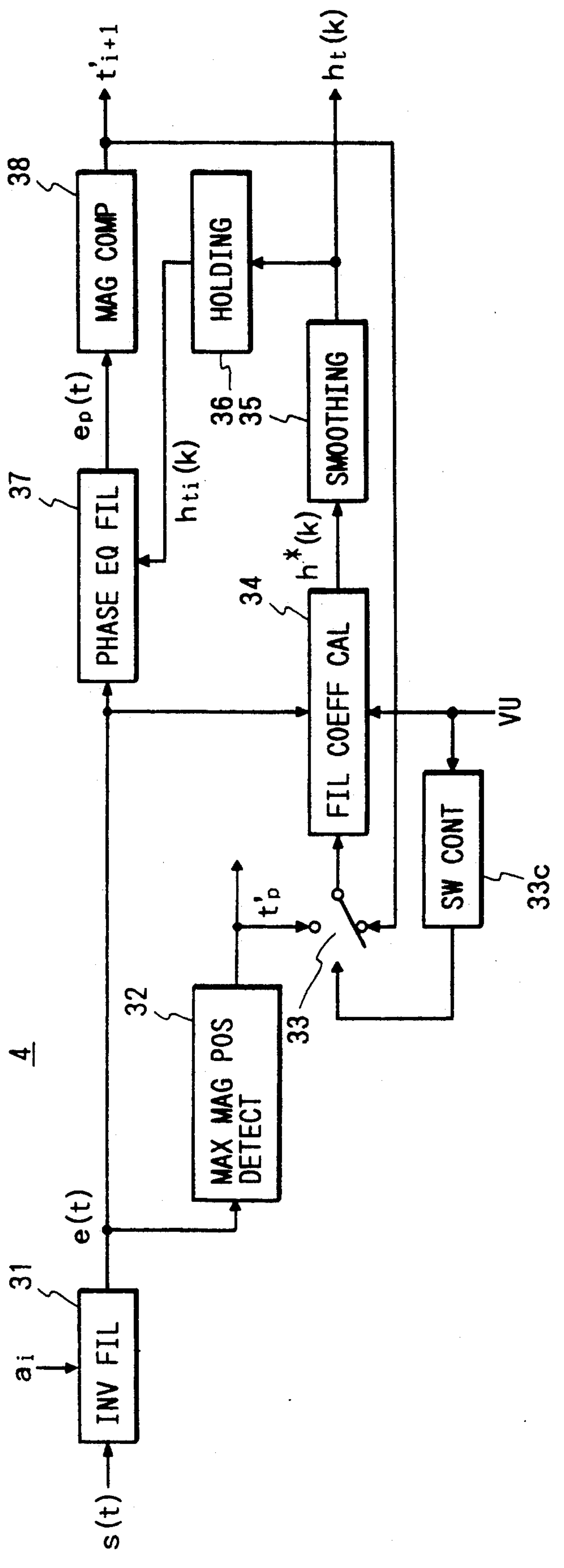
FIG. 2 is a block diagram showing an example of a phase equalizing and analyzing part 4.

In the phase equalizing-analyzing part 4 coefficients of a phase equalizing filter for rendering the phase characteristic of the speech into a zero phase and reference time points of phase equalization are computed. FIG. 2 shows in detail the constitution of the phase equalizing-analyzing part 4. The speech signal s(t) is applied to an inverse filter 31 to obtain the prediction residual e(t). The prediction residual e(t) is provided to a maximum magnitude position detecting part 32 and a phase equalizing filter 37. A switch control part 33C monitors the decision signal VU fed from the linear predictive analyzing part 2 and normally connects a switch 33 to the output side of a magnitude comparing part 38, but when the current window is of a voiced sound V and the immediately preceding frame is of an unvoiced sound U, the switch 33 is connected to the output side of the maximum magnitude position detecting part 32. In this instance, the maximum magnitude position detecting part 32 detects and outputs a sample time point $t'_p$ at which the magnitude of the prediction residual e(t) is maximum.

Let it be assumed that smoothed phase-equalizing filter coefficients $h_{t'_i}(k)$ have been obtained for the currently determined reference time point $t'_i$ at a coefficient smoothing part 35. The coefficients $h_{t'_i}(k)$ are supplied from the filter coefficient holding part 36 to the phase equalizing filter 37. The precipitation residual e(t), which is the output of the inverse filter 31, is phase-equalized by the phase equalizing filter 37 and output therefrom as phase-equalized prediction residual $e_p(t)$. It is well known that when the input speech signal s(t) is a voiced sound signal, the prediction residual e(t) of the speech signal has a waveform having impulses at the pitch intervals of the voiced sound. The phase equalizing filter 37 produces an effect of emphasizing the magnitudes of impulses of such pitch intervals.

The magnitude comparing part 38 compares levels of the phase-equalized prediction residual $e_p(t)$ with a predetermined threshold value, determines, as an impulse position, each sample time point where the sample value exceeds the threshold value, and outputs the impulse position as the next reference time point $t'_{i+1}$ on the condition that an allowable minimum value of the impulse intervals is $L_{min}$, and the next reference time point $t'_{i+1}$ is searched for sample points spaced more than the value $L_{min}$ apart from the time point $t'_i$.

When the frame is an unvoiced sound frame, the phase-equalized residual $e_p(t)$ during the unvoiced sound frame is composed of substantially random components (or white noise) which are considerably lower than the threshold value mentioned above, and the magnitude comparing part 38 does not produce, as an output of the phase equalizing-analyzing part 4, the next reference time point $t'_{i+1}$. Rather, the magnitude comparing part 38 determines a dummy reference time point $t'_{i+1}$ at, for example, the last sample point of the frame (but not limited thereto) so as to be used for determination of smoothed filter coefficients at the smoothing part 35 as will be explained later.

In response to the next reference time point $t'_{i+1}$ thus obtained in the voiced sound frame, a filter coefficient calculating part 34 calculates (2M+1) filter coefficients h*(k) of the phase equalizing filter 37 in accordance with the following equation:

$$h^*(k) = e(t'_{i+1} - k) / \sqrt{\sum_{n=-M}^{M} e(t'_{i+1} + n)^2} \quad (1)$$

where k=−M, −(M−1), . . . , 0, 1, . . . , M. On the other hand, when the frame is of an unvoiced sound frame, the filter coefficient calculating part 34 calculates the filter coefficients h*(k) of the phase equalizing filter 37 by the following equation:

$$h^*(k) = \begin{cases} 1 \text{ for } k = 0 \\ 0 \text{ for } k \neq 0 \end{cases} \quad (2)$$

where k=−M, . . . , M. The characteristic of the phase-equalizing filter 37 expressed by Eq. (2) represents such a characteristic that the input signal thereto is passed therethrough intact.

The filter coefficients h*(k) thus calculated for the next reference time point $t'_{i+1}$ are smoothed by the coefficient smoothing part 35 as will be described later to obtain smoothed phase equalizing filter coefficients $h_{t'_{i+1}}(k)$, which are held by the coefficient holding part 36 and supplied as updated coefficients $h_{t'_i}(k)$ to the phase equalizing filter 37. The phase equalizing filter 37 having its coefficients thus updated phase-equalizes the prediction residual e(t) again, and based on its output, the next impulse position, i.e., a new next reference time point $t'_{i+1}$ is determined by the magnitude comparing part 38. In this way, a next reference time point $t'_{i+1}$ is determined based on the phase-equalized residual $e_p(t)$ output from the phase equalizing filter 37 whose coefficients have been set to $h_{t'_i}(k)$ and, thereafter, new smoothed filter coefficients $h_{t'_{i+1}}(k)$ are calculated for the reference time point $t'_{i+1}$. By repeating these processes using the reference time point $t'_{i+1}$ and the smoothed filter coefficients $h_{t'_{i+1}}(k)$ as new $t'_i$ and $h_{t'_i}(k)$, reference time points in each frame and the smoothed filter coefficients $h_{t'_i}(k)$ for these reference time points are determined in a sequential order.

In the case where a speech is initiated after a silent period or where a voiced sound is initiated after continued unvoiced sounds, the prediction residual e(t) including impulses of the pitch frequency are provided, for the first time, to the phase equalizing filter 37 having set therein the filter coefficients given essentially by Eq. (1). In this instance, the magnitudes of impulses are not emphasized and, consequently, the prediction residual e(t) is output intact from the filter 37. Hence, when the magnitudes of impulses of the pitch frequency happen to be smaller than the threshold value, the impulses cannot be detected in the magnitude comparing part 38. That is, the speech is processed as if no impulses are contained in the prediction residual, and consequently the filter coefficients h*(k) for the impulse positions are not obtained——this is not preferable from the viewpoint of the speech quality in the speech analysis-synthesis.

To solve this problem, in the FIG. 2 embodiment, when the input speech signal analysis window changes from an unvoiced sound frame to a voiced sound frame as mentioned above, the maximum magnitude position detecting part 32 detects the maximum magnitude position $t'_p$ of the prediction residual e(t) in the voiced sound frame and provides it via the switch 33 to the filter coefficient calculating part 34 and, at the same time, outputs it as a reference time point. The filter coefficient calculating part 34 calculates the filter coefficients h*(k), using the reference time point $t'_p$ in place of $t'_{i+1}$ in Eq. (2).

Next, a description will be given of the smoothing process of the phase equalizing filter coefficients h*(k) by the coefficient smoothing part 35. The filter coefficients h*(k) determined for the next reference time point $t'_{i+1}$ and supplied to the smoothing part 35 are smoothed temporarily by a filtering process of first order expressed by, for example, the following recurrence formula:

$$h_t(k) = bh_{t-1}(k) + (1-b)h^*(k) \quad (3)$$

where: $t'_i < t \leqq t'_{i+1}$.

The coefficient b is set to a value of about 0.97. In Eq. (3), $h_{t-1}(k)$ represents smoothed filter coefficients at an arbitrary sample point (t−1) in the time interval between the current reference time point $t'_i$ and the next reference time point $t'_{i+1}$, and $h_t(k)$ represents the smoothed filter coefficients at the next sample point. This smoothing takes place for every sample point from a sample point next to the current reference time point $t'_i$, for which the smoothed filter coefficients have already been obtained, to the next reference time point $t'_{i+1}$ for which the smoothed filter coefficients are to be obtained next. The filter coefficient holding part 36 holds those of the thus sequentially smoothed filter coefficients $h_t(k)$ which were obtained for the last sample point which is the next reference time point, that is, $h_{t'_{i+1}}(k)$, and supplies them as updated filter coefficients $h_{t'_{i+1}}(k)$ to the phase equalizing filter 37 for further determination of a subsequent next reference time point.

The phase equalizing filter 37 is supplied with the prediction residual e(t) and calculates the phase-equalized prediction residual $e_p(t)$ by the following equation:

$$e_p(t) = \sum_{k=-M}^{M} h_{t'_i}(k) e(t-k) \quad (4)$$

The calculation of Eq. (4) needs only to be performed until the next impulse position is detected by the magnitude comparing part 38 after the reference time point $t'_i$ at which the above-said smoothed filter coefficients were obtained. In the magnitude comparing part 38 the magnitude level of the phase-equalized prediction residual $e_p(t)$ is compared with a threshold value, and the sample point where the former exceeds the latter is detected as the next reference time point $t'_{i+1}$ in the current frame. Incidentally, in the case where no magnitude exceeds the threshold value within a predetermined period after the latest impulse position (reference time point) $t'_i$, processing is performed by which the time point where the phase-equalized prediction residual $e_p(t)$ takes the maximum magnitude until then is detected as the next reference time point $t'_{i+1}$.

The procedure for obtaining the reference time point $t'_i$ and the smoothed filter coefficients $h_{t'_i}(k)$ at that point as described above may be briefly summarized in the following outline.

Step 1: At first, the phase-equalized prediction residual $e_p(t)$ is calculated by Eq. (4) using the filter coefficients $h_{t'i}(k)$ set in the phase equalizing filter 37 until then, that is, the smoothed filter coefficients obtained for the last impulse position in the preceding frame, and the prediction residual $e_p(t)$ of the given frame. This calculation needs only to be performed until the detection of the next impulse after the preceding impulse position.

Step 2: The magnitude of the phase-equalized prediction residual is compared with a threshold value in the magnitude comparing part 38, the sample point at which the residual exceeds the threshold value is detected as an impulse position, and the first impulse position $t_{i+1}$ (i =0, that is, $t_1$) in the current frame is obtained as the next reference time point.

Step 3: The coefficients $h^*(k)$ of the phase equalizing filter at the reference time point $t_1$ is calculated substituting the time point $t_1$ for $t'_{i+1}$ in Eq. (1).

Step 4: The filter coefficients $h^*(k)$ for the first reference time $t_1$ is substituted into Eq. (3), and the smoothed filter coefficients $h_t(k)$ at each of sample points after the preceding impulse position (the last impulse position $t_0$ in the preceding frame) are calculated by Eq. (3) until the time point of the impulse position $t_1$. The smoothed filter coefficients at the reference time point $t_1$ obtained as a result is represented by $h_{t1}(k)$.

Step 5; The phase-equalized prediction residual $e_p(t)$ is calculated substituting the smoothed filter coefficients $h_{t1}(k)$ for the reference time point $t_1$ into Eq. (4). This calculation is performed for a period from the reference time point $t_1$ to the detection of the next impulse position (reference time point) $t_2$.

Step 6: The second impulse position $t_2$ of the phase-equalized prediction residual thus calculated is determined in the magnitude comparing part 38.

Step 7: The second impulse position $t_2$ is substituted for the reference time point $t'_{i+1}$ in Eq. (1) and the phase equalizing filter coefficients $h^*(k)$ for the impulse position $t_2$ are calculated.

Step 8: The filter coefficients for the second impulse position $t_2$ is substituted into Eq. (4) and the smoothed filter coefficients at respective sample points are sequentially calculated starting at a sample point next to the first impulse position $t_1$ and ending at the second impulse position $t_2$. As a result of this, the smoothed filter coefficients $h_{t2}(k)$ at the second impulse position $t_2$ are obtained.

Thereafter, steps 5 through 8, for example, are repeatedly performed in the same manner as mentioned above, by which the smoothed filter coefficients $h_{t'i}(k)$ at all impulse positions in the frame can be obtained.

As shown in FIG. 1A, the smoothed filter coefficients $h_t(k)$ obtained in the phase equalizing-analyzing part 4 are used to control the phase equalizing filter 5. By inputting the speech signal s(t) into the phase equalizing filter 5, the processing expressed by the following equation is performed to obtain a phase-equalized speech signal Sp(t).

$$Sp(t) = \sum_{k=-M}^{M} h_t(k)s(t-k) \quad (5)$$

Next, an excitation parameter analyzing part 30 will be described. In the analysis-synthesis method of the present invention different excitation sources are used for voiced and unvoiced sounds and a switch 17 is changed over by the voiced or unvoiced sound decision signal VU. The voiced sound excitation source comprises an impulse sequence generating part 7 and an all-zero filter (hereinafter referred to simply as zero filter) 10.

The impulse sequence generating part 7 generates such a quasi-periodic impulse sequence as shown in FIG. 3 in which the impulse position $t_i$ and the magnitude $m_i$ of each impulse are specified. The temporal position (the impulse position) $t_i$ and the magnitude $m_i$ of each impulse in the quasi-periodic impulse sequence are represented as parameters. The impulse position $t_i$ is produced by an impulse position generating part 6 based on the reference time point $t'_i$, and the impulse magnitude $m_i$ is controlled by an impulse magnitude calculating part 8.

In the impulse position generating part 6 the interval between the reference time points (representing the positions of impulses of the pitch frequency in the phase-equalized prediction residual) determined in the phase equalizing-analyzing part 4 is controlled to be quasi-periodic so as to reduce fluctuations in the impulse position and hence reduce the amount of information necessary for representing the impulse position. That is, the interval, $T_i=t_i-t_{i-1}$, between impulses to be generated, shown in FIG. 3, is limited so that a difference in the interval between successive impulses is equal to or smaller than a fixed allowable value J as expressed by the following equation:

$$\Delta T_i = |T_i - T_{i-1}| \leq J \quad (6)$$

Next, a description will be given, with reference to FIG. 4, of an example of the impulse position generating procedure which the impulse position generating part 6 implements.

Step $S_1$: When all the reference time points $t'_i$ (where i =1, 2, . . . ) in the current frame are input from the phase equalizing-analyzing part 4, the process proceeds to the next step $S_2$ if the preceding frame is a voiced sound frame (the current frame being also a voiced sound frame).

Step $S_2$: A calculation is made of a difference, $\Delta T_1 = T_i - T_{i-1}$, between two successive intervals $T_i = t'_i - t_{i-1}$ and $T_{i-1} = t_{i-1} - t_{i-2}$ of the first reference time point $t_i$ (where i=1) and the two impulse positions $t_{i-1}$ and $t_{i-2}$ (already determined by the processing in FIG. 4 for the last two reference time points $t_{i-2}$ and $t_{i-1}$ in the preceding frame).

Step $S_3$: The absolute value of the difference $\Delta T_1$ is compared with the predetermined value J. When the former is equal to or smaller than the latter, it is determined that the input reference time point $t'_i$ is within a predetermined variation range, and the process proceeds to step $S_4$. When the former is greater than the latter, it is determined that the reference time point $t'_i$ varies in excess of the predetermined limit, and the process proceeds to step $S_6$.

Step $S_4$: Since the reference time point $t'_i$ is within the predetermined variation range, this reference time point is determined as the impulse position $t_i$.

Step $S_5$: It is determined whether or not processing has been completed for all the reference time points $t'_i$ in the frame, and if not, the process goes back to step $S_2$, starting processing for the next reference time point $t_{i+1}$. If the processing for all the reference time points has been completed, then the process proceeds to step $S_{17}$.

Step $S_6$: A calculation is made of a difference, $\Delta T_2=(t'_i-t_{i-1})/2-(t_{i-1}-t_{i-2})$, between half of the interval $T_i$ between the impulse position $t_{i-1}$ and the reference time point $t'_i$ and the already determined interval $T_{i-1}$.

Step $S_7$: The absolute value of the above-mentioned difference $\Delta T_2$ is compared with the value J, and if the former is equal to or smaller than the latter, the interval $T_i$ is about twice larger than the decided interval $T_{i-1}$ as shown in FIG. 5A; in this case, the process proceeds to step $S_8$.

Step $S_8$: An impulse position $t_c$ is set at about the midpoint between the reference time point $t'_i$ and the preceding impulse position $t_{i-1}$, and the reference time point $t'_i$ is set at the impulse position $T_{i+1}$ and then the process proceeds to step $S_5$.

Step $S_9$: When the condition in step $S_7$ is not satisfied, a calculation is made of a difference, $\Delta T_3$, between the interval from the next reference time point $t'_{i+1}$ to the impulse position $t_{i-1}$ and the decided interval from the impulse position $t_{i-1}$ to $t_{i-2}$.

Step $S_{10}$: The absolute value of the above-mentioned difference $\Delta T_3$ is compared with the value J. When the former is equal to or smaller than the latter, the reference time point $t'_{i+1}$ is within an expected range of the impulse position $t_i$ next to the decided impulse position $t_{i-1}$ and the reference time point $t'_i$ is outside the range and in between $t'_{i+1}$ and $t_{i-1}$. The process proceeds to step $S_{11}$.

Step $S_{11}$: The excess reference time point $t'_i$ shown in FIG. 5B is discarded, but instead the reference time point $t'_{i+1}$ is set at the impulse position $t_i$ and the process proceeds to step $S_5$.

Step $S_{12}$: Where the condition in step $S_{10}$ is not satisfied, a calculation is made of a difference $\Delta T_4$ between half of the interval between the reference time point $t'_{i+1}$ and the impulse position $t_{i-1}$ and the above-mentioned decided interval $T_{i-1}$.

Step $S_{13}$: The absolute value of the difference $\Delta T_4$ is compared with the value J. When the former is equal to or smaller than the latter, it means that the reference time point $t'_{i+1}$ is within an expected range of the impulse position $t_{i+1}$ next to that $t_i$ as shown in FIG. 5C and that the reference time point $t'_i$ is either one of two reference time points $t'_i$ shown in FIG. 5C and is outside an expected range of the impulse position $t_i$. In this instance, the process proceeds to step $S_{14}$.

Step $S_{14}$: The reference time point $t'_{i+1}$ is set as the impulse position $t_{i+1}$, and at the same time, the reference time point $t'_i$ is shifted to the midpoint between $t'_{i+1}$ and $t_{i-1}$ and set as the impulse position $t_i$, that is, $t_i=(t'_{i+1}+t_{i-1})/2$. The process proceeds to step $S_5$.

Step $S_{15}$: Where the condition in step $S_{14}$ is not satisfied, the reference time point $t'_i$ is set as the impulse position $t_i$ without taking any step for its inappropriateness as a pitch position. The process proceeds to step $S_5$.

Step $S_{16}$: Where the preceding frame is an unvoiced sound frame in step $S_1$, all the reference time points $t'_i$ in the current frame are set to the impulse positions $t_i$.

Step $S_{17}$: The number of impulse positions is compared with a predetermined maximum permissible number of impulses Np, and if the former is equal to or smaller than the latter, then the entire processing is terminated. The number Np is a fixed integer ranging from 5 to 6, for example, and this is the number of impulses present in a 15 msec frame in the case where the upper limit of the pitch frequency of a speech is regarded as ranging from about 350 to 400 Hz at the highest.

Step $S_{18}$: Where the condition in step $S_{17}$ is not satisfied, the number of impulse positions is greater than the number Np; so that magnitudes of impulses are calculated for the respective impulse positions by the impulse magnitude calculating part 8 in FIG. 1 as described later.

Step $S_{19}$: An impulse position selecting part 6A in FIG. 1 chooses Np impulse positions in the order of magnitude and indicates the chosen impulses to the impulse position generating part 6, with which the process is terminated.

According to the processed described above in respect of FIG. 4, even if the impulse position of the phase-equalized prediction residual which is detected as the reference time point $t'_i$ undergoes a substantial change, a fluctuation of the impulse position $t_i$ which is generated by the impulse position generating part 6 is limited within a certain range. Thus, the amount of information necessary for representing the impulse position can be reduced. Moreover, even in the case where the impulse magnitude at the pitch position in the phase-equalized prediction residual happens to be smaller than a threshold value and cannot be detected by the magnitude comparing part 38 in FIG. 2, an impulse signal is inserted by steps $S_7$ and $S_8$ in FIG. 4; so that the quality of the synthesized speech is not essentially impaired in spite of a failure in impulse detection.

Figure 6:
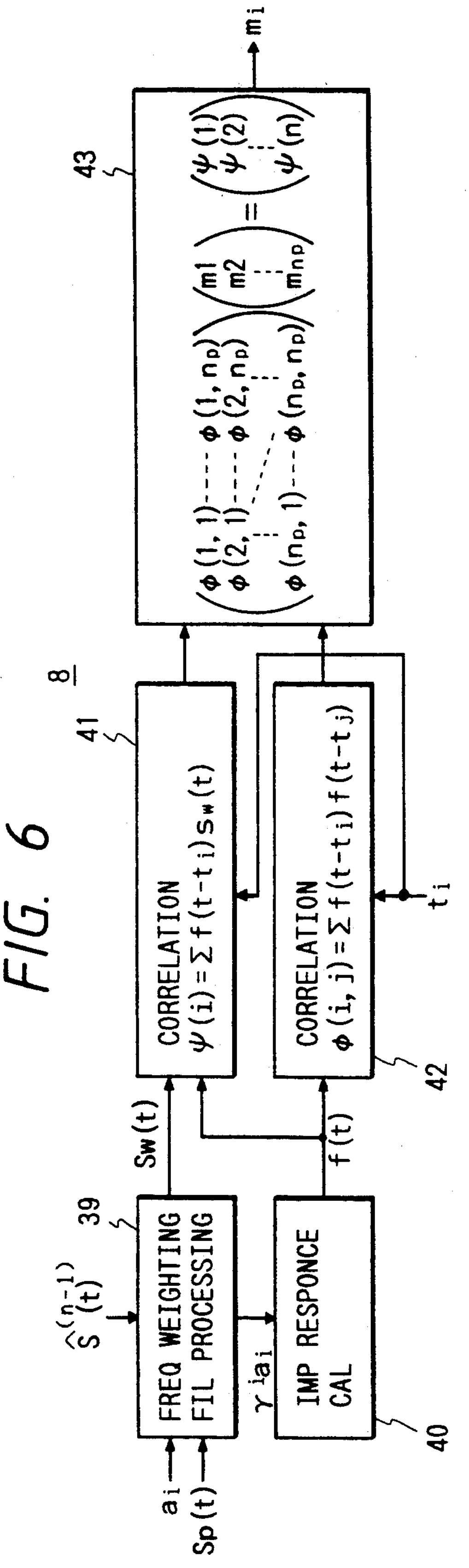
FIG. 6 is a block diagram illustrating an example of an impulse magnitude calculation part 8.

In the impulse magnitude calculating part 8 the impulse magnitude at each impulse position $t_i$ generated by the impulse position generating part 6 is selected so that a frequency-weighted mean square error between a synthesized speech waveform Sp'(t) produced by exciting such an all-pole filter 18 with the impulse sequence created by the impulse sequence generating part 7 and an input speech waveform Sp(t) phase-equalized by a phase equalizing filter 5 may be eventually minimized. FIG. 6 shows the internal construction of the impulse magnitude calculating part 8. The phase-equalized input speech waveform Sp(t) is supplied to a frequency weighting filter processing part 39. The frequency weighting filter processing part 39 acts to expands the band width of the resonance frequency components of a speech spectrum and its transfer characteristic is expressed as follows:

$$Hw(z) = \frac{A(z)}{A(z/\gamma)} \quad (7)$$

where:

$$A(z) = 1 + a_1 z^{-1} + \ldots + a_p z^{-p} \quad (8)$$

where $a_i$ are the linear prediction coefficients and $z^{-1}$ is a sampling delay. $\gamma$ is a parameter which controls the degree of suppression and is in the range of $0<\gamma\leqq 1$, and the degree of suppression increases as the value of $\gamma$ decreases. Usually, $\gamma$ is in the range of 0.7 to 0.9.

Figure 6A:
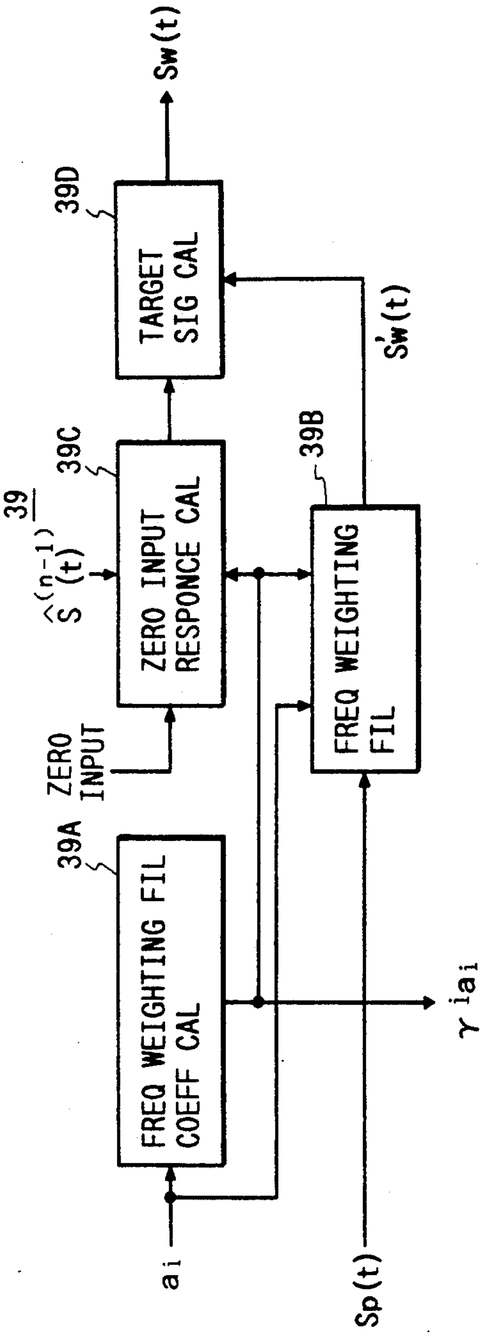
FIG. 6A is a block diagram illustrating a frequency weighting filter processing part 39 shown in FIG. 6.

The frequency weighting filter processing part 39 has such a construction as shown in FIG. 6A. The linear prediction coefficients $a_i$ are provided to a frequency weighting filter coefficient calculating part 39A, in which coefficients $\gamma^i a_i$ of a filter having a transfer characteristic $A(z/\gamma)$ are calculated. A frequency weighting filter 39B calculates coefficients of a filter having a transfer characteristic $Hw(z)=A(z)/A(z/\gamma)$, from the linear prediction coefficients $a_i$ and the frequency-weighted coefficients $\gamma^i a_i$ and at the same time, the phase-equalized speech Sp(t) is passed through the filter of that transfer characteristic to obtain a signal S'w(t).

A zero input response calculating part 39C uses, as an initial value, a synthesized speech $S(t)^{(n-1)}$ obtained as the output of an all-pole filter 18A (see FIG. 1) of a transfer characteristic $1/A(z/\gamma)$ in the preceding frame and outputs an initial response when the all-pole filter 18A is excited by a zero input.

A target signal calculating part 39D subtracts the output of the zero input response calculating part 39C from the output S'w(t) of the frequency weighting filter 39B to obtain a frequency-weighted signal Sw(t). On the other hand, the output $\gamma^i a_i$ of the frequency weighting filter coefficient processing part 39A is supplied to an impulse response calculating part 40 in FIG. 6, in which an impulse response f(t) of a filter having the transfer characterized $1/A(z/\gamma)$ is calculated.

A correlation calculating part 41 calculates, for each impulse position $t_i$, a cross correlation $\psi(i)$ between the impulse response $f(t-t_i)$ and the frequency-weighted signal Sw(t) as follows:

$$\psi(i) = \sum_{t=0}^{N-1} f(t-t_i)Sw(t) \qquad (9)$$

where i=1, 2, . . . , np, np being the number of impulses in the frame and N the number of samples in the frame.

Another correlation calculating part 42 calculates a covariance $\phi(i, j)$ of the impulse response for a set of impulse positions $t_i$, $t_j$ as follows:

$$\phi(i, j) = \sum_{t=0}^{N-1} f(t-t_i)f(t-t_j) \qquad (10)$$

An impulse magnitude calculating part 43 obtains impulse magnitudes $m_i$ from $\psi(t)$ and $\phi(i, j)$ by solving the following simultaneous equations, which equivalently minimize a mean square error between a synthesized speech waveform obtainable by exciting the all-pole filter 18 with the impulse sequence thus determined and the phase-equalized speech waveform Sp(t).

$$\begin{pmatrix} \phi(1,1) & \cdots & \phi(1,np) \\ \phi(2,1) & \cdots & \phi(2,np) \\ \vdots & & \vdots \\ \phi(np,1) & \cdots & \phi(np,np) \end{pmatrix} \begin{pmatrix} m_1 \\ m_2 \\ \vdots \\ m_{np} \end{pmatrix} = \begin{pmatrix} \psi(1) \\ \psi(2) \\ \vdots \\ \psi(np) \end{pmatrix} \qquad (11)$$

The impulse magnitudes $m_i$ are quantized by the quantizer 9 in FIG. 1 for each frame. This is carried out by, for example, a scalar quantization or vector quantization method. In the case of employing the vector u=-quantization technique, a vector (a magnitude pattern) using respective impulse magnitudes $m_i$ as its elements is compared with a plurality of predetermined standard impulse magnitude patterns and is quantized to that one of them which minimizes the distance between the patterns. A measure of the distance between the magnitude patterns corresponds essentially to a mean square error between the speech waveform Sp'(t) synthesized, without using the zero filter, from the standard impulse magnitude pattern selected in the quantizer 9 and the phase-equalized input speech waveform Sp(t). For example, letting the magnitude pattern vector obtained by solving Eq. (11) be represented by $m=(m_1, m_2, \ldots, m_{np})$ and letting standard pattern vectors stored as a table in the quantizer 9 be represented by $m_{ci}$ (i=1, 2, . . . , Nc), the mean square error is given by the following equation:

$$d(m, m_c) = (m-m_{ci})^t\Phi(m-m_{ci}) \qquad (12)$$

where t represents the transposition of a matrix and $\Phi$ is a matrix using, as its elements, the auto-covariance $\phi(i, j)$ of the impulse response. In this case, the quantized value m of the above-mentioned magnitude pattern is expressed by the following equation, as a standard pattern which minimizes the mean square error $d(m, m_c)$ in Eq, (12) in the aforementioned plurality of standard pattern vectors $m_{ci}$.

$$m = \arg\min_{m_{ci}} d(m, m_{ci}) \qquad (13)$$

Figure 7A:
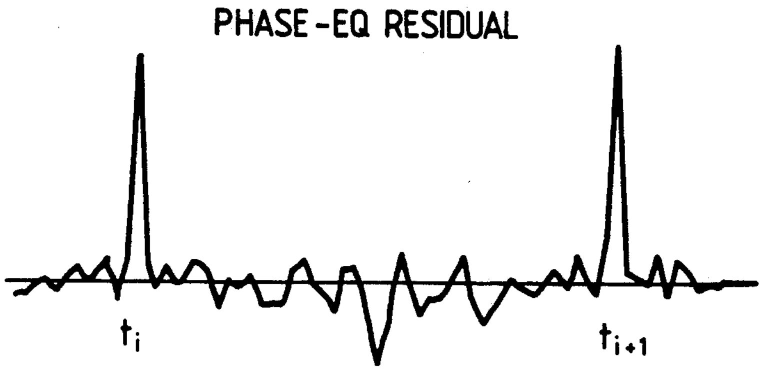
FIG. 7A is a diagram showing an example of the waveform of a phase-equalized prediction residual.
Figure 7B:
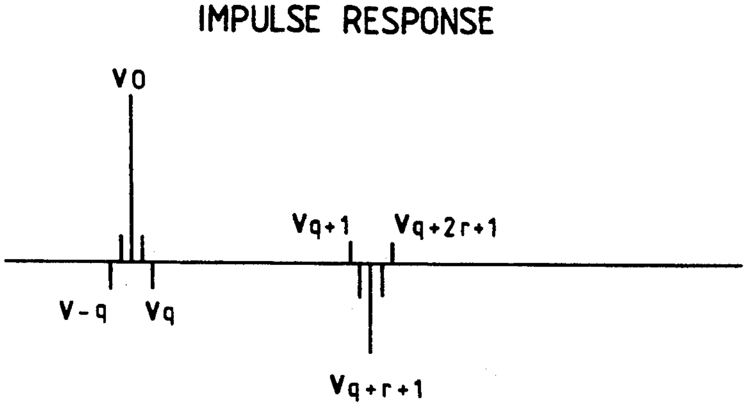
FIG. 7B is a diagram showing an impulse response of a zero filter.

The zero filter 10 is to provide an input impulse sequence with a feature of the phase-equalized prediction residual waveform, and the coefficients of this filter are produced by a zero filter coefficient calculating part 11. FIG. 7A shows an example of the phase-equalized prediction residual waveform $e_p(t)$ and FIG. 7B an example of an impulse response waveform of the zero filter 10 for the input impulse thereto. The phase-equalized prediction residual $e_p(t)$ has a flat spectral envelope characteristic and a phase close to zero, and hence is impulsive and large in magnitude at impulse positions $t_i$, $t_{i+1}$, . . . but relatively small at other positions. The waveform is substantially symmetric with respect to each impulse position and each midpoint between adjacent impulse positions, respectively. In many cases, the magnitude at the midpoint is relatively larger than at other positions (except for impulse positions) as will be seen from FIG. 7A, and this tendency increases for a speech of a long pitch frequency, in particular. The zero filter 10 is set so that its impulse response assume values at successive q sample points on either side of the impulse position $t_i$ and at successive r sample points on either side of the midpoint between the adjacent impulse positions $t_i$ and $t_{i+1}$, as depicted in FIG. 7B. In this instance, the transfer characteristic of the zero filter 10 is expressed as follows:

$$v(z) = \sum_{k=-q}^{q} v_k z^{-k} + \sum_{k=-r}^{r} v_{k+r+q+1} z^{-(k+Ti/2)} \qquad (14)$$

Figure 8:
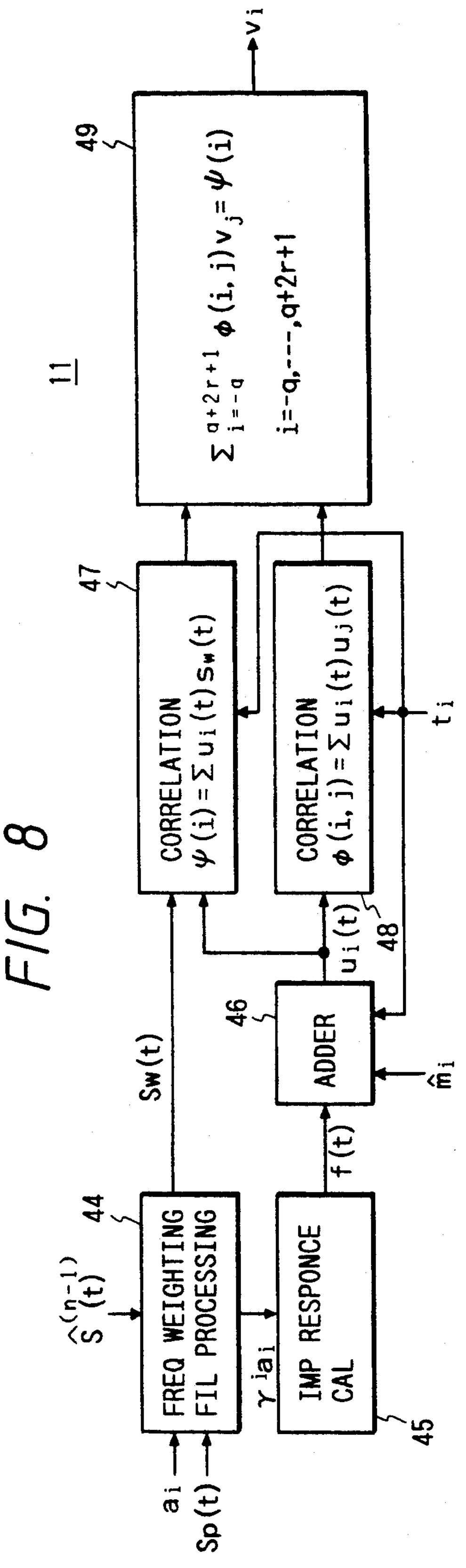
FIG. 8 is a block diagram illustrating an example of a zero filter coefficient calculation part 11.

In the zero filter coefficient calculating part 11, for an impulse sequence of given impulse positions and impulse magnitudes, filter coefficients $v_k$ are determined such that a frequency-weighted mean square error between the synthesized speech waveform Sp'(t) and the phase-equalized input speech waveform Sp(t) may be minimum. FIG. 8 illustrates the construction of the filter coefficient calculating part 11. A frequency weighting filter processing part 44 and an impulse response calculating part 45 are identical in construction with the frequency weighting filter processing part 39 and the impulse response calculating part 40 in FIG. 6, respectively. An adder 46 adds the output impulse response f(t) of the impulse response calculating part 45 in accordance with the following equation:

$$u_k(t) = \begin{cases} \sum_{j=1}^{np} m_j f(t - t_j + k) \text{ for } |k| \leq q \\ \sum_{j=1}^{np} m_j f(t - t_j + k - l + T_j/2) \text{ for } |k - l| \leq r \end{cases} \quad (15)$$

where $l=q+r+1$.

A correlation calculating part 47 calculates the cross-covariance $\phi(i)$ between the signals Sw(t) and $u_i(t)$, and another correlation calculating part 48 calculates the auto-covariance $\phi(i, j)$ between the signals $u_i(t)$ and $u_j(t)$. A filter coefficient calculating part 49 calculates coefficients $v_i$ of the zero filter 10 from the above-said cross correlation $\phi(i)$ and covariance $\phi(i, j)$ by solving the following simultaneous equations:

$$\begin{pmatrix} \phi(-q, -q) & \cdots & \phi(-q, q + 2r + 1) \\ \phi(-q + 1, -q) & \cdots & \phi(-q + 1, q + 2r + 1) \\ \vdots & & \vdots \\ \phi(q + 2r + 1, -q) & \cdots & \phi(q + 2r + 1, q + 2r + 1) \end{pmatrix} \begin{pmatrix} v_{-q} \\ v_{-q+1} \\ \vdots \\ v_{q+2r+1} \end{pmatrix} = \begin{pmatrix} \psi(-q) \\ \psi(-q + 1) \\ \vdots \\ \psi(q + 2r + 1) \end{pmatrix} \quad (16)$$

These solutions eventually minimize a mean square error between a synthesized speech waveform obtainable by exciting the all-pole filter 18 with the output of the zero filter 10 and the phase-equalized speech waveform Sp(t).

The filter coefficient $v_i$ is quantized by a quantizer 12 in FIG. 1. This is performed by use of a scalar quantization or vector quantization technique, for example. In the case of employing the vector quantization technique, a vector (a coefficient pattern) using the filter coefficients $v_i$ as its elements is compared with a plurality of predetermined standard coefficient patterns and is quantized to a standard pattern which minimizes the distance between patterns. If a measure essentially corresponding to the mean square error between the synthesized speech waveform Sp'(t) and the phase-equalized input speech waveform Sp(t) is used as the measure of distance as in the case of the vector quantization of the impulse magnitude by the aforementioned quantizer 9, the quantized value v of the filter coefficients is obtained by the following equation:

$$v = \arg \min_{v_{ci}} d(v, v_{ci}) \quad (17)$$

$$d(v, v_c) = (v - v_{ci})^t \Phi (v - v_{ci})$$

where v is a vector using, as its elements, coefficients $v_{-q}, v_{-q+1}, \ldots, v_{q+2r+1}$ obtained by solving Eq. (16), and $v_{ci}$ is a standard pattern vector of the filter coefficients. Further, $\Phi$ is a matrix using as its elements the covariance $\phi(i, j)$ of the impulse response $u_i(t)$.

To sum up, in the voiced sound frame the speech signal Sp'(t) is synthesized by exciting an all-pole filter featuring the speech spectrum envelope characteristic, with a quasi-periodic impulse sequence which is determined by impulse positions based on the phase-equalized residual $e_p(t)$ and impulse magnitudes determined so that an error of the synthesized speech is minimum. Of the excitation parameters, the impulse magnitudes $m_i$ and the coefficients $v_i$ of the zero filter are set to optimum values which minimize the matching error between the synthesized speech waveform Sp'(t) and the phase-equalized speech waveform Sp(t).

Next, excitation in the unvoiced sound frame will be described. In the unvoiced sound frame a random pattern is used as an excitation signal as in the case of code excited linear predictive coding (Schroeder, et al., "Code excited linear prediction (CELP)", IEEE Int. On ASSP, pp 937-940, 1985). A random pattern generating part 13 in FIG. 1 has stored therein a plurality of patterns each composed of a plurality of normal random numbers with a mean 0 and a variance 1. A gain calculating part 15 calculates, for each random pattern, a gain $g_i$ which makes equal the power of the synthesized speech Sp'(t) by the output random pattern and the power of the phase-equalized speech Sp(t), and a scalar-quantized gain $g_i$ by a quantizer 16 is used to control an amplifier 14. Next, a matching error between a synthesized speech waveform Sp'(t) obtained by applying each of all the random patterns to the all-pole filter 18 and the phase-equalized speech Sp'(t) is obtained by the waveform matching error calculating part 19. The errors thus obtained are decided by the error deciding part 20 and the random pattern generating part 13 searches for an optimum random pattern which minimizes the waveform matching error. In this embodiment one frame is composed of three successive random patterns. This random pattern sequence is applied as the excitation signal to the all-pole filter 18 via the amplifier 14.

Following the above procedure, the speech signal is represented by the linear prediction coefficients $a_i$ and the voiced/unvoiced sound parameter VU; the voiced sound is represented by the impulse positions $t_i$, the impulse magnitudes $m_i$ and zero filter coefficients $v_i$, and the unvoiced sound is represented by the random number code pattern (number) $c_i$ and the gain $g_i$. These parameters $a_i$ and VU produced by the linear predictive analyzing part 2, $t_i$ produced by the impulse position generating part 6, $m_i$ produced by the quantizer 9, $v_i$ produced by the quantizer 12, $c_i$ produced by the random pattern generator 13, and $g_i$ produced by the quantizer 16 are supplied to the coding part 21, as represented by the connections shown at the bottom of FIG. 1A and the top of FIG. 1B. These speech parameters are coded by the coding part 21 and then transmitted or stored. In a speech synthesizing part the speech parameters are decoded by a decoding part 22. In the case of the voiced sound, an impulse sequence composed of the impulse positions $t_i$ and the impulse magnitudes $m_i$ is produced in an impulse sequence generating part 23 and is applied to a zero filter 24 to create an excitation signal. In the case of the unvoiced sound, a random pattern is selectively generated by a random pattern generating part 25 using the random number code (signal) $c_i$ and is applied to an amplifier 26 which is controlled by the gain $g_i$ and in which it is magnitude-controlled to produce an excitation signal. Either one of the excitation signals thus produced is selected by a switch 27 which is controlled by the voiced/unvoiced parameter VU and the excitation signal thus selected is applied to an all-pole filter 28 to excite it, providing a synthesized speech at its output end 29. The filter coefficients of the zero filter 24 are controlled by $v_i$ and the filter coefficients of the all-pole filter 28 are controlled by $a_i$.

In a first modified form of the above embodiment the impulse excitation source is used in common to voiced and unvoiced sounds in the construction of FIG. 1. That is, the random pattern generating part 13, the amplifier 14, the gain calculating part 15, the quantizer 16 and the switch 17 are omitted, and the output of the zero filter 10 is applied directly to the all-pole filter 18. This somewhat impairs speech quality for a fricative consonant but permits simplification of the structure for processing and affords reduction of the amount of data to be processed; hence, the scale of hardware used may be small. Moreover, since the voiced/unvoiced sound parameter need not be transmitted, the bit rate is reduced by 60 bits per second.

In a second modified form, the zero filter 10 is not included in the impulse excitation source in FIG. 1, that is, the zero filter 10, the zero filter coefficient calculating part 11 and the quantizer 12 are omitted, and the output of the impulse sequence generating part 7 is provided via the switch 17 to the all-pole filter 18. (The zero filter 24 is also omitted accordingly.) With this method, the natural sounding property of the synthesized speech is somewhat degraded for speech of a male voice of a low pitch frequency, but the removal of the zero filter 10 reduces the scale of hardware used and the bit rate is reduced by 600 bits per second which are needed for coding filter coefficients.

Figure 9:
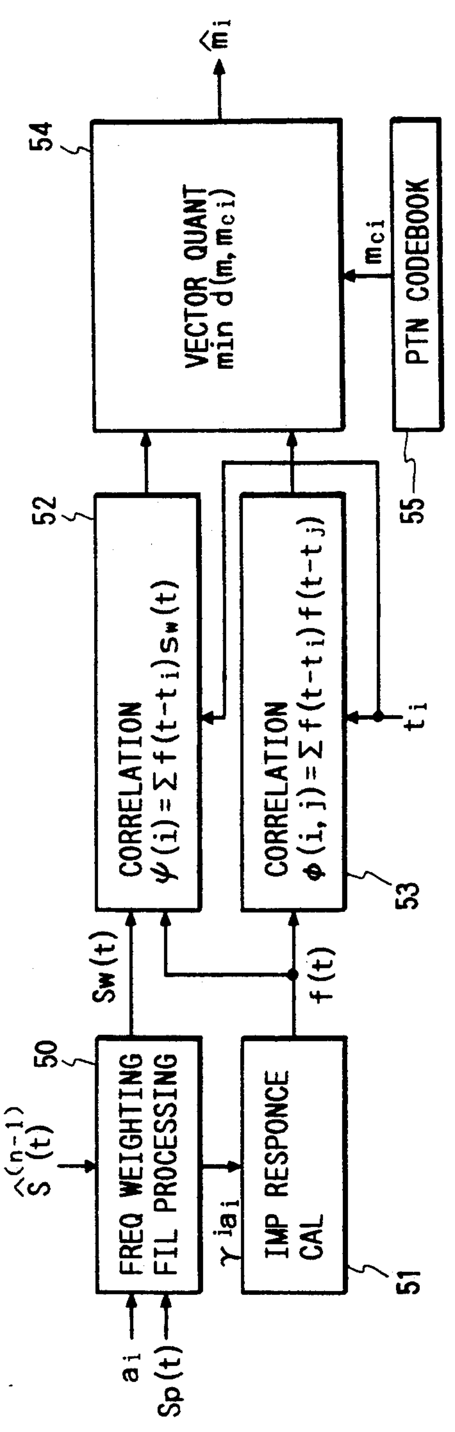
FIG. 9 is a block diagram illustrating another example of the impulse magnitude calculation part 8.

In a third modified form, processing by the impulse magnitude calculating part 8 and processing by the vector quantizing part 9 in FIG. 1 are integrated for calculating a quantized value of the impulse magnitudes. FIG. 9 shows the construction of this modified form. A frequency weighting filter processing part 50, an impulse response calculating part 51, a correlation calculating part 52 and another correlation calculating part 53 are identical in construction with those in FIG. 6. In an impulse magnitude (vector) quantizing part 54, for each impulse standard pattern $m_{ci}$ (where $i=1, 2, \ldots, Nc$) from a PTN codebook 55, a mean square error between a speech waveform synthesized using the magnitude standard pattern and the phase-equalized input speech waveform Sp(t) is calculated, and an impulse magnitude standard pattern is obtained which minimizes the error. A distance calculation is performed by the following equation:

$$d = m_{ci}^t \Phi m_{ci} - 2 m_{ci}^t \psi,$$

where $\Phi$ is a matrix using the covariance $\phi(i, j)$ of the impulse response f(t) as matrix elements and $\psi$ is a column vector using, as its elements, the cross correlation $\psi(i)$ (where $i=1, 2, \ldots, n_p$) of the impulse response and the output Sw(t) of the frequency weighting filter processing part 50.

The structures shown in FIGS. 6 and 9 are nearly equal in the amount of data to be processed for obtaining the optimum impulse magnitude, but in FIG. 9 processing for solving the simultaneous equations included in the processing of FIG. 6 is not required and the processor is simple-structured accordingly. In FIG. 6, however, the maximum value of the impulse magnitude can be scalar-quantized, whereas in FIG. 9 it is premised that the vector quantization method is used.

It is also possible to calculate quantized values of coefficients by integrating the calculation of the coefficients $v_i$ of the zero filter 10 and the vector quantization by the quantizer 12 in the same manner as mentioned above with respect to FIG. 9.

Figure 4:
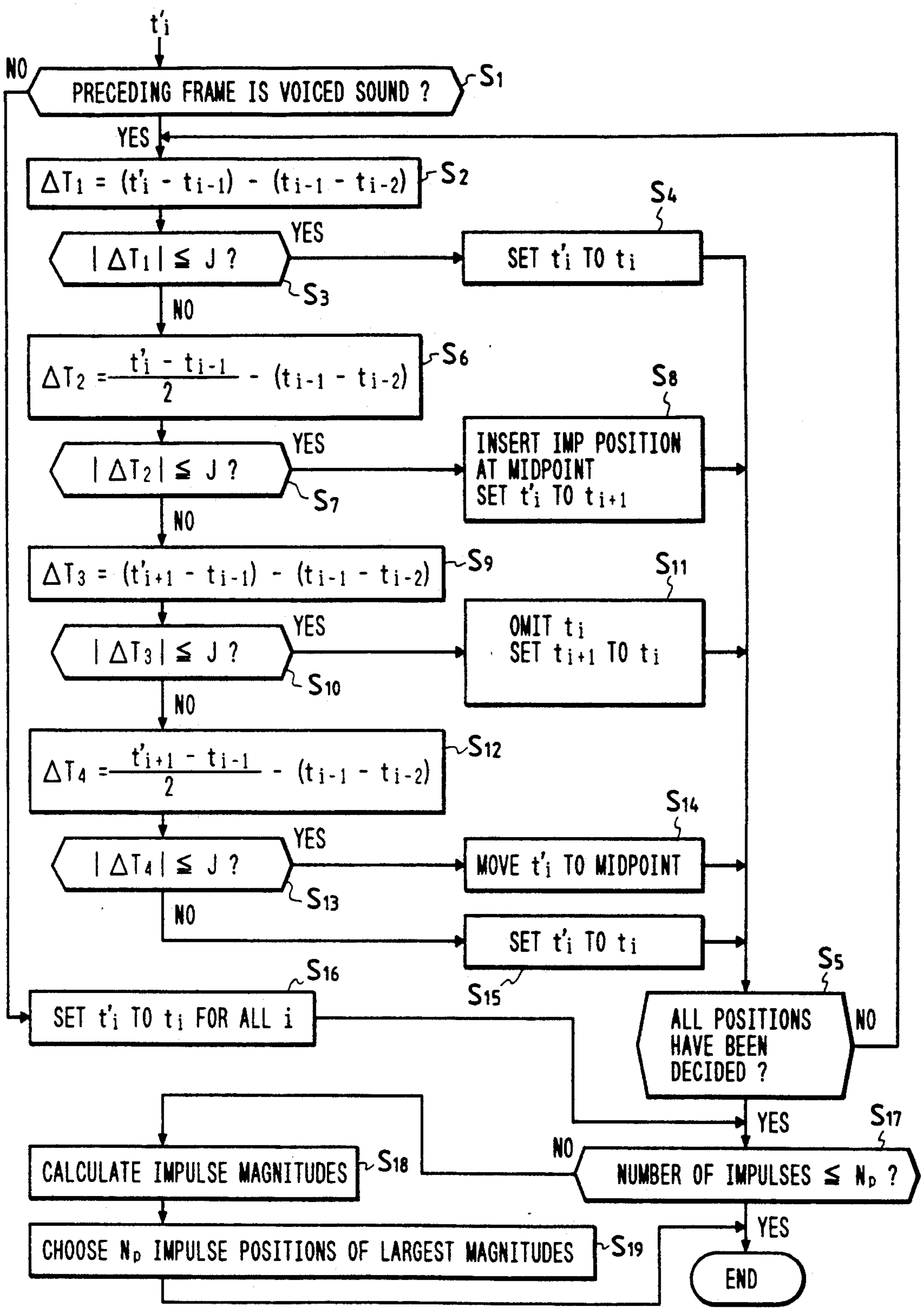
FIG. 4 is a flowchart of an impulse position generating process.

In a fourth modified form of the FIG. 1 embodiment, the impulse position generating part 6 is not provided, and consequently, processing shown in FIG. 4 is not involved, but instead all the reference time points $t'_i$ provided from the phase equalizing-analyzing part 4 are used as impulse positions $t_i$. This somewhat increases the amount of information necessary for coding the impulse positions but simplifies the structure and speeds up the processing. Yet, the throughput for enhancing the quality of the synthesized speech by the use of the zero filter 10 may also be assigned for the reduction of the impulse position information at the expense of the speech quality.

It is evident that in the embodiments of the speech analysis-synthesis apparatus according to the present invention, their functional blocks shown may be formed by hardware and functions of some or all of them may be performed by a computer.

To evaluate the effect of the speech analysis-synthesis method according to the present invention, experiments were conducted using the following conditions. After sampling a speech in a 0 to 4 kHz band at a sampling frequency 8 kHz, the speech signal is multiplied by a Hamming window of an analysis window 30 ms long and a linear predictive analysis by an auto-correlation method is performed with the degree of analysis set to 12, by which 12 prediction coefficients $a_i$ and the voiced/unvoiced sound parameter are obtained. The processing of the excitation parameter analyzing part 30 is performed for each frame 15 ms (120 speech samples) equal to half of the analysis window. The prediction coefficients are quantized by a differential multiple stage vector quantizing method. As a distance criterion in the vector quantization, a frequency weighted cepstrum distance was used. When the bit rate is 4.8 kb/s, the number of bits per frame is 72 bits and details are as follows:

| Parameters | Number of bits/Frame |
|---|---|
| Prediction coefficients | 24 |
| Voiced/unvoiced sound parameter | 1 |
| Excitation source (for voiced sound) | |
| Impulse positions | 29 |
| Impulse magnitudes | 8 |
| Zero filter coefficients | 10 |
| Excitation source (for unvoiced sound) | |
| Random patterns | 27 (9 × 3) |
| Gains | 18 ((5 + 1) × 3) |

The constant J representing the allowed limit of fluctuations in the impulse frequency in the impulse source, the allowed maximum number of impulses per frame, Np, and the allowed minimum value of impulse intervals, $L_{min}$, are dependent on the number of bits assigned for coding of the impulse positions. In the case of coding the impulse positions at the rate of 29 bits/frame, it is preferable, for example, that the difference between adjacent impulse intervals, $\Delta T$, be equal to or smaller than 5 samples, the maximum number of impulses, Np, be equal to or smaller than 6 samples, and the allowed minimum impulse interval $L_{min}$ be equal to or greater than 13 samples. A filter of degree 7 (q=r=1) was used as the zero filter 10. The random pattern vector $c_i$ is composed of 40 samples (5 ms) and is selected from 512 kinds of patterns (9-bit). The gain $g_i$ is scalar-quantized using 6 bits including a sign bit.

The speech coded using the above conditions is more natural sounding than speech by the conventional vocoder and its quality is close to that of the original speech. Further, the dependence of speech quality on the speaker in the present invention is lower than in the case of the prior art vocoder. It has been ascertained that the quality of the coded speech is apparently higher than in the cases of the conventional multipulse predictive coding and the code excited predictive coding. A spectral envelope error of a speech coded at 4.8 kb/s is about 1 dB. A coding delay of this invention is 45 ms, which is equal to or shorter than that of the conventional low-bit rate speech coding schemes.

Figure 10:
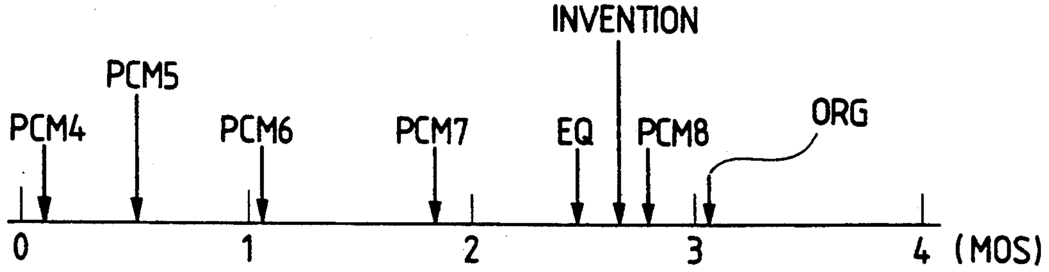
FIG. 10 is a diagram showing the results of comparison of synthesized speech quality between the present invention and the prior art.

A short Japanese sentence uttered by two men and two women was speech-analyzed using substantially the same conditions as those mentioned above to obtain the excitation parameters, the prediction coefficients and the voiced/unvoiced parameter VU, which were then used to synthesize a speech, and an opinion test for the subjective quality evaluation of the synthesized speech was conducted by 30 persons. In FIG. 10 the results of the test are shown in comparison with those in the cases of other coding methods. The abscissa represents MOS (Mean Opinion Score) and ORG the original speech. PCM4 to PCM8 represent synthesized speeches by 4 to 8-bit Log-PCM coding methods, and EQ indicates a phase-equalized speech. The test results demonstrate that the coding by the present invention is performed at a low bit rate of 4.8 kb/s but provides a high quality synthesized speech equal in quality to the synthesized speech by the 8-bit Log-PCM coding.

According to the present invention, by expressing the excitation signal for a voiced sound as a quasi-periodic impulse sequence, the reproducibility of speech waveform information is higher than in the conventional vocoder and the excitation signal can be expressed with a smaller amount of information than in the conventional multiphase prediction coding. Moreover, since an error between the input speech waveform and the phase-equalized speech waveform is used as the criterion for estimating the parameters of the excitation signal from the input speech, the present invention enhances matching between the synthesized speech waveform and the input speech waveform as compared with the prior art utilizing an error between the input speech itself and the synthesized speech, and hence permits an accurate estimation of the excitation parameters. Besides, the zero filter produces the effect of reproducing fine spectral characteristics of the original speech, thereby making the synthesized speech more natural sounding.

It will be apparent that many modifications and variations may be effected without departing from the scope of the novel concepts of the present invention.

What is claimed is:

1. A speech analyzing apparatus comprising:

linear predictive analysis means for performing a linear predictive analysis of an input speech signal for each analysis window of a fixed length to obtain prediction coefficients, said linear predictive analysis means including means for determining whether said input speech signal in an analysis window of fixed length is voiced or unvoiced and for providing a voiced/unvoiced decision signal;

inverse filter means controlled by said prediction coefficients, for deriving a prediction residual from said input speech signal;

speech phase equalizing filter means for rendering the phase of said input speech signal into a zero phase to obtain a phase-equalized speech signal;

prediction residual phase equalizing filter means for rendering the phase of said prediction residual into a zero phase to obtain a phase-equalized prediction residual signal;

reference time point gathering means for detecting impulses of magnitudes larger than a predetermined threshold value in said phase-equalized prediction residual signal and for outputting the positions of said impulses as reference time points;

impulse position generating means responsive to said reference time points and said voiced/unvoiced decision signal for producing, based on said reference time points when said decision signal indicates that said speech signal is a voiced sound, differences between successive intervals of said reference time points for comparing the differences with a predetermined limit range, and for determining positions of impulses such that when the differences are within said predetermined limit range, said reference time points are determined as impulse positions, and when said difference are in excess of said predetermined limit range, impulse positions are determined by adding a time point to said reference time points or by omission of one of said reference time points or by shift of one of said reference time points so that the differences between the successive intervals of the processed reference time points are held within said limit range, said impulse positions thus determined being one of the parameters representing the excitation signal as a result of the speech analysis;

impulse sequence generating means for receiving said impulse positions from said impulse position generating means and generating impulses at said impulse positions;

all-pole filter means controlled by said prediction coefficients and excited by said generated impulse sequence to generate a synthesized speech; and impulse magnitude calculating means for determining magnitude values of said impulses generated by said impulse sequence generating means which minimize an error between a waveform of a synthesized speech obtainable by exciting said all-pole filter means with said impulse sequence and a waveform of said phase-equalized speech supplied from said speech phase equalizing filter means, and means for outputting said impulse magnitudes for use as another one of the parameters representing the excitation signal as a result of the speech analysis by said speech analyzing apparatus.

2. The apparatus according to claim 1 further comprising:

zero filter means for providing said impulse sequence with features of the waveform of said phase-equalized prediction residual signal and supplying the output thereof to said all-pole filter means as the excitation signal; and zero filter coefficient calculating means for establishing the coefficients of said zero filter means which minimize an error between a waveform of a synthesized speech obtained by exciting said all-pole filter means with the output of said zero filter means and a waveform of said phase-equalized speech.

3. The apparatus of claim 1 or 2, wherein said apparatus further includes random pattern generating means for generating a random pattern which minimizes an error between a waveform of a synthesized speech obtained by exciting said all-pole filter means with one of a plurality of predetermined random patterns and a waveform of said phase-equalized speech in a window during which said decision signal is unvoiced.

4. The apparatus of claim 1 or 2, wherein said impulse sequence generating means includes vector quantizing mans for vector quantizing the magnitude values of said impulses determined by said impulse magnitude calculating means.

5. A method for analyzing a speech to generate parameters representing an input speech waveform including parameters of an excitation signal for exciting a linear filter representing a speech spectral envelope characteristic, comprising the steps of:

producing a phase-equalized prediction residual of the input speech waveform;

determining reference time points where levels of said phase-equalized prediction residual exceed a predetermined threshold;

determining whether the input speech waveform in each of a plurality of successive analysis windows, each of which is of fixed time length, is voiced or unvoiced sound;

obtaining the difference between intervals of successive ones of said reference time points in each analysis window;

when the input speech waveform is voiced sound, selecting impulse positions based on said reference time points such that when the difference between the intervals of the successive reference time points in each analysis window is within a predetermined range, the reference time points are selected as impulse positions, and when the difference between the intervals of the successive reference time points exceeds the predetermined range, impulse positions are selected by moving or deleting the reference time points or inserting reference time points to define a sequence of quasi-periodic impulses so that the differences between successive reference time points are within said predetermined range the positions of said quasi-periodic impulse sequence being one of the parameters representing said excitation signal; and so selecting magnitudes of the respective impulses of the quasi-periodic sequence in each analysis window as to minimize an error between the phase-equalized speech waveform and a synthesized speech waveform obtained by exciting said linear filter with said quasi-periodic impulse sequence, the magnitudes of the quasi-periodic impulses being another of the parameters representing said excitation signal.

6. The method of claim 5 wherein, before being applied to said linear filter, said quasi-periodic impulses are processed by a zero filter, said method including the step of selecting coefficients of said zero filter which minimize an error between said phase-equalized speech waveform and a synthesized speech waveform obtained by exciting said linear filter with the output of said zero filter, whereby said processing of said quasi-periodic impulses by said zero filter gives the sequence of said quasi-periodic impulses features of the waveform of said phase-equalized prediction residual signal, and using said coefficients of said zero filter as one of said parameters representing said excitation signal.

7. The method of claim 5 or 6 wherein said excitation signal is used for a voiced sound and a random sequence selected from a plurality of predetermined random patterns is used as an excitation signal for an unvoiced sound, said method including so selecting one of said predetermined random patterns representing said excitation signal for said unvoiced sound as to minimize an error between said phase-equalized speech waveform nd a synthesized speech waveform obtainable by exciting said linear filter with said random patterns, and using said selected one of the predetermined random patterns to produce one of the parameters representing the input speech waveform.

* * * * *